United States Patent
Oh et al.

(10) Patent No.: US 8,438,112 B2
(45) Date of Patent: May 7, 2013

(54) HOST DEVICE, PORTABLE STORAGE DEVICE, AND METHOD FOR UPDATING META INFORMATION REGARDING RIGHT OBJECTS STORED IN PORTABLE STORAGE DEVICE

(75) Inventors: Yun-sang Oh, Seoul (KR); Sang-sin Jung, Seoul (KR); Kyung-im Jung, Seongnam-si (KR); Moon-sang Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1659 days.

(21) Appl. No.: 11/331,090

(22) Filed: Jan. 13, 2006

(65) Prior Publication Data

US 2006/0156413 A1 Jul. 13, 2006

Related U.S. Application Data

(60) Provisional application No. 60/643,150, filed on Jan. 13, 2005.

(30) Foreign Application Priority Data

May 20, 2005 (KR) ................. 10-2005-0042623

(51) Int. Cl.
*G06F 21/00* (2006.01)
(52) U.S. Cl.
USPC .......................................... 705/59; 726/26
(58) Field of Classification Search .............. 705/50–51, 705/59; 726/26
See application file for complete search history.

(56) References Cited

U.S. PATENT DOCUMENTS

| 5,003,510 | A | * | 3/1991 | Kamisaki ................. 365/189.16 |
| 5,740,349 | A | * | 4/1998 | Hasbun et al. ................. 714/6.13 |
| 6,141,656 | A | * | 10/2000 | Ozbutun et al. ..................... 1/1 |
| 7,136,974 | B2 | * | 11/2006 | Burton et al. ....................... 711/162 |
| 7,278,049 | B2 | * | 10/2007 | Bartfai et al. ................... 714/6.3 |
| 7,870,397 | B2 | * | 1/2011 | Lee et al. ....................... 713/193 |
| 2004/0260900 | A1 | | 12/2004 | Burton et al. |
| 2005/0091508 | A1 | * | 4/2005 | Lee et al. ....................... 713/182 |
| 2005/0177694 | A1 | * | 8/2005 | Peinado .......................... 711/163 |
| 2005/0195660 | A1 | * | 9/2005 | Kavuri et al. ............. 365/189.05 |

FOREIGN PATENT DOCUMENTS

| JP | 5-54002 A | 3/1993 |
| JP | 2000-347696 A | 12/2000 |
| JP | 2002-268941 A | 9/2002 |
| JP | 2002-366419 A | 12/2002 |
| WO | WO03/091885 A1 * | 11/2003 |

OTHER PUBLICATIONS

DRM Specification V2.0 Candidate Version 2.0—Dec. 10, 2004Open Mobile Alliance OMA-DRM-DRM-V2_0-20041210-C.*

(Continued)

*Primary Examiner* — James D Nigh
(74) *Attorney, Agent, or Firm* — Sughrue Mion, PLLC

(57) ABSTRACT

A host device, a portable storage device, and a method of updating an RO stored in the portable storage device are provided. The method includes receiving a predetermined bitmap from a host device, performing a bitwise operation on the received bitmap and meta information indicating a state of the RO, and updating the meta information using a result of the bitwise operation.

20 Claims, 10 Drawing Sheets

OTHER PUBLICATIONS

Anderson et al. ("Mobile and PDA technologies and their future use in education", JISC Technology and Standards Watch: 04-03, Nov. 2004, 33 pages).*

Buford, J. et al., "Analysis of using java card for DRM master key security", Consumer Communications and Networking Conference, 2006. CCNC 2006. 2006 3$^{rd}$ IEEE vol. 2, Jan. 8-10, 2006 pp. 1129-1133.

Onieva, J.A., et al, "Extending an OMA-based DRM Framework with Non-Repudiation Services", Signal Processing and Information Technology, 2005. Proceedings of the Fifth IEEE International Symposium on Dec. 18-21, 2005 pp. 472-477.

Yu Zheng, et al., "Secure DRM scheme for future mobile networks based on trusted mobile platform", Wireless Communications, Networking and Mobile Computing, 2005. Proceedings. 2005, International Conference on vol. 2, Sep. 23-26, 2005, pp. 1164-1167.

Soriano, M., et al., "Mobile Digital Rights Management: Security Requirements and Copy Detection Mechanisms", Database and Expert Systems Applications, 2005. Proceedings. Sixteenth International Workshop on Aug. 22-26, 2005, pp. 251-256.

Japanese Office Action issued Oct. 4, 2011 in corresponding Japanese Patent Application No. 2007-550311.

Canadian Office Action, dated Mar. 17, 2011, issued in Application No. 2,592,885.

Office Action dated Aug. 3, 2010, issued by the Japan Patent Office in counterpart Japanese Patent Application No. JP 2007-550311.

* cited by examiner

HOST DEVICE, PORTABLE STORAGE DEVICE, AND METHOD FOR UPDATING META INFORMATION REGARDING RIGHT OBJECTS STORED IN PORTABLE STORAGE DEVICE

CROSS-REFERENCE TO RELATED APPLICATIONS

This application claims priority from Korean Patent Application No. 10-2005-0042623 filed on May 20, 2005 in the Korean Intellectual Property Office, and U.S. Provisional Patent Application No. 60/643,150 filed on Jan. 13, 2005 in the United States Patent and Trademark Office, the disclosures of which are incorporated herein by reference in their entirety.

BACKGROUND OF THE INVENTION

1. Field of the Invention

Apparatuses and methods consistent with the present invention relate to digital rights management, and more particularly, to updating meta information regarding right objects stored in a portable storage device.

2. Description of the Related Art

Recently, digital rights management (hereafter, referred to as DRM) is being actively researched and developed. Commercial services using DRM have already been implemented. DRM is useful because of the following various characteristics of digital content.

That is, unlike analog data, digital content can be copied without loss and can be easily reused, processed, and distributed, and only a small amount of cost is needed to copy and distribute the digital content. However, a large amount of cost, labor, and time are needed to produce the digital content. Thus, when the digital content is copied and distributed without permission, a producer of the digital content may lose the opportunity to profit from the digital content, and accordingly, enthusiasm for creation may be discouraged. As a result, development of the digital content business may be hampered.

There are several efforts ongoing to protect digital content. In the related art, digital content protection has been concentrated on preventing non-permitted access to digital content, and permitting only people who paid a fee to access the digital content. Thus, people who paid fees for the digital content are allowed access to unencrypted digital content, while people who did not pay fees are not allowed access. In this case, when a person who has paid for the digital content intentionally distributes the digital content to other people, however, the other people are able to use the digital content without paying any fees. To solve this program, DRM was introduced.

In DRM, anyone is allowed to freely access encoded digital content (hereafter, referred to as encrypted contents), but a license referred to as a rights object is required for decoding and executing the digital content.

Meanwhile, a portable storage device such as an XD card or a multimedia card (MMC) is a storage device that is portable and easily removable from a host device such as a mobile phone, a computer, or a digital camera. The portable storage device has various computing capabilities including data storage, operation and data control, and overcoming limitations of conventional hard disks or compact disks. Recently, a security function has been added to such portable storage devices, thereby developing a portable storage device that secures digital contents during storage and transmission, and protects copyright. The development of the portable storage device has led DRM to apply to management of ROs stored in the portable storage device. That is, the ROs are stored in the portable storage device and the host device plays back encrypted content using the ROs stored in the portable storage device.

In this case, the portable storage device may store predetermined meta information for the ROs stored by itself. The meta information is meta data indicating a status of each RO. It is often the case that meta information of the portable storage device is updated. Thus, the update of the meta information may be overhead in the portable storage device usually having less computation capacity than the host device. Therefore, a technique of reducing a data operation load of the portable storage device is desired.

Meanwhile, Korean Published Patent Application No. 2002-0020104 discloses an SRAM with a cache capability in order to increase the input and output speed of a memory card. When the memory card is combined with a digital device, the disclosed SRAM is initialized and serves as a cache storing particular data in subsequent read and write operations, thereby increasing the input and output speed of the data.

According to the disclosed technology, a separate SRAM is additionally provided in addition to a commonly used flash memory.

However, development of a method for reducing the overall operation quantity of a portable storage device while covering an increasingly advancing data input/output speed is still desired.

SUMMARY OF THE INVENTION

The present invention provides a method of updating meta information of rights objects stored in a portable storage device, which reduces a data operation quantity.

The above and other aspects of the present invention will become clear to those skilled in the art upon review of the following description, the attached drawings and appended claims.

According to an aspect of the present invention, there is provided a method of updating meta information of a rights object (RO) stored in a portable storage device, the method including generating a bitmap subjected to a bitwise operation together with meta information indicating a state of the RO stored in the portable storage device and used in updating the meta information, and transmitting the generated bitmap to the portable storage device.

According to another aspect of the present invention, there is provided a method of updating meta information of rights objects (RO)s stored in a portable storage device includes receiving a predetermined bitmap from a host device, performing a bitwise operation on the received bitmap and meta information indicating states of the ROs, and updating the meta information using a result of the bitwise operation.

According to still another aspect of the present invention, there is provided a host device including a bit generating module which generates a bitmap subjected to a bitwise operation together with meta information indicating a state of the RO stored in the portable storage device and used in updating the meta information, and a storage interface module which transmits the generated bitmap to the portable storage device.

According to a further aspect of the present invention, there is provided a portable storage device comprising a storage module which stores ROs and meta information indicating states of the ROs; a host interface module which receives a predetermined bitmap from a host device; a bitwise operation module which performs a bitwise operation on the received bitmap and the meta information; and a control module which updates the meta information using a result of the bitwise operation.

BRIEF DESCRIPTION OF THE DRAWINGS

The above and other aspects of the present invention will become more apparent by describing in detail exemplary embodiments thereof with reference to the accompanying drawings in which.

DETAILED DESCRIPTION OF EXEMPLARY EMBODIMENTS OF THE INVENTION

Figure 1:
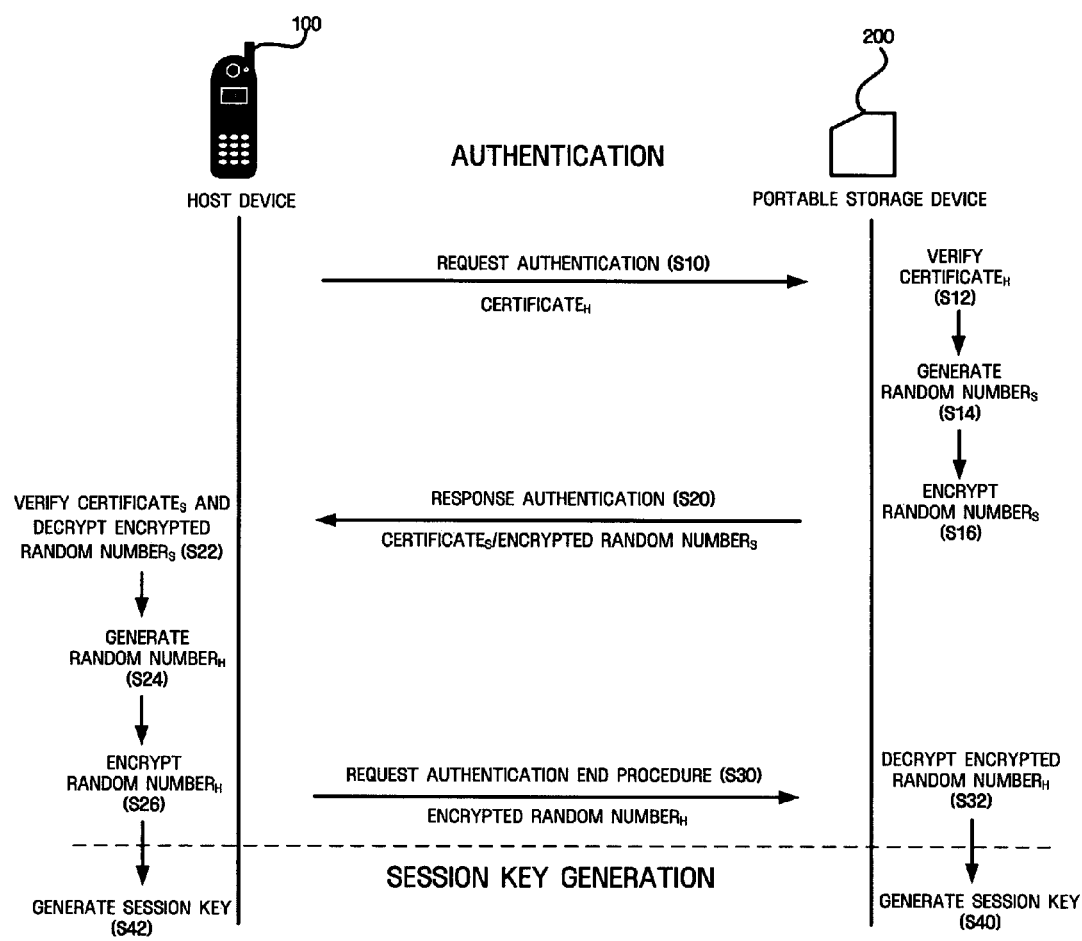
FIG. 1 is a flowchart illustrating an authentication procedure according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these exemplary embodiments are provided so that the disclosure will be thorough and complete and will fully convey the concept of the invention to those skilled in the art. Like reference numerals refer to like elements throughout the specification.

Hereinafter, exemplary embodiments of the present invention will be described in detail with reference to the attached drawings.

Before the detailed description is set forth, terms used in this specification will be described briefly. Description of the terms is to be construed for providing a better understanding of the specification and terms that are not explicitly defined herein are not intended to limit the broad aspect of the invention.

—Host Device

A host device is connectable to a portable storage device and enables playing back of encrypted content using rights object (RO) stored in the portable storage device. Exemplary host devices are portable multimedia devices such as mobile phones, PDAs, or MP3 players, or fixed multimedia devices such as desk-top computers or digital TVs.

—Portable Storage Device

A portable storage device described in the exemplary embodiments of the present invention includes a non-volatile memory such as a flash memory which data can be written to, read from, and deleted from and which can be connected to a host device. Examples of such a portable storage device include smart media, memory sticks, compact flash (CF) cards, xD cards, and multimedia cards (MMC).

—Rights Object

A rights object is a type of permission to use an encrypted content. Types of permission include "Play", "Display", "Execute", "Print", "Export" and "Inspect" the encrypted content. Examples of ROs in the present invention are the same as those defined for an open mobile alliance (OMA) DRM system.

—Public-Key Cryptography

This is also referred to as asymmetric cryptography because a key used in decrypting data and a key used in encrypting the data are different from each other. In public-key cryptography, a pair of a public key and a private key is used for encryption and decryption. The public key is not necessary to be kept in secret, i.e., the public is easily accessible thereto while the private key must be known only to a specific device. Examples of public key encryption algorithms include Diffie-Hellman, RSA, El Gamal, Elliptic Curve, etc.

—Symmetric-Key Cryptography

This is also referred to as secret key cryptography, where a key used to encrypt data and a key used to decrypt the data are the same as each other. As an example of such symmetric key cryptography, a data encryption standard (DES) is used most generally, but applications adopting the advanced encryption standard (AES) have recently increased.

—Random Number

A random number is a sequence of numbers or characters with random properties.

—Meta Information

Meta information is referred to as predetermined meta data for a rights object (RO). More concretely, examples of such meta information include state information for the RO stored in a portable storage device, such as information regarding whether the RO is usable or not, or information regarding how many times the RO can be copied, moved from one to another device, or played. Thus, the meta information may be composed of a set of bits representing state information regarding an RO. Preferably, the state information can be divided into two types according to usability of the RO: an usable state or an unusable state.

—Bitwise Operation

A bitwise operation is a logical operation for determining new logical values through a combination of logical values and logical variables. In the bitwise operation, various operators, including OR, AND, XOR (exclusive OR), NOR (not OR), NAND (not AND), and so on, are used.

In general, prior to connection and exchanging data between a host device and a portable storage device, authentication is performed. Authentication is a fundamental procedure in which the host device and the portable storage device authenticate each other's genuineness, thereby maintaining security data exchanged therebetween, which will be described with reference to FIG. 1.

In the illustrative embodiment, a subscript "H" of data indicates that the data is possessed or generated by a host device 100 and a subscript "S" of data indicates that the data is possessed or generated by a portable storage device 200.

In operation S10, the host device 100 sends an authentication request to the portable storage device 200. When requesting authentication, the host device 100 may send the portable storage device 200 a certificate$_H$, which was issued to the host device 100 by a certification authority. The certificate$_H$ is signed with a digital signature of the certification authority and contains a device ID$_H$ and the public key$_H$.

In operation S12, the portable storage device 200 verifies whether the certificate$_H$ of the host device 100 is valid using a certificate revocation list (CRL). If the certificate$_H$ is registered in the CRL, the portable storage device 200 may reject the authentication with the host device 100. If the certificate$_H$ is not registered in the CRL, the portable storage device 200 obtains the public key$_H$ using the certificate$_H$ of the host device 100.

If it is determined that the host device 100 is verified as an authenticated device, that is, the certificate$_H$ of the host device 100 is valid, in operation S14, the portable storage device 200 generates a random number$_S$. In operation S16, the generated random number$_S$ is encrypted using the public key$_H$.

In operation S20, the portable storage device 200 performs an authentication response procedure. During the authentication procedure, the portable storage device 200 sends a certificate$_S$, which was issued to the portable storage device 200 by the certification authority, and the encrypted random number$_S$. The certificate$_S$ is signed with a digital signature of the certification authority and contains an ID$_H$ and public key$_H$ of the portable storage device 200.

In operation S22, the host device 100 receives the certificate$_S$ and encrypted random number$_S$ and authenticates the portable storage device 200 by verifying the certificate$_S$, and decrypts the encrypted random number$_S$ using its own private key$_H$. Here, the host device 100 obtains the public key$_S$ of the portable storage device 200 using the certificate$_S$ of the portable storage device 200. In addition, verification of the certificate$_S$ may also be performed on the portable storage device 200 using CRL.

If the portable storage device 200 is verified as an authenticated device using the certificate$_S$ of the portable storage device 200, in operation S24, the host device 100 generates a random number$_H$. In operation S26, the generated random number$_H$ is encrypted using the public key$_S$ of the portable storage device 200.

Thereafter, the host device 100 requests the portable storage device 200 for an authentication end procedure in operation S30. When requesting for the authentication end procedure, the host device 100 sends the encrypted random number$_H$ to the portable storage device 200.

In operation 32, the portable storage device 200 receives the encrypted random number$_H$ and decrypts the random number$_H$ using its private key$_S$.

Accordingly, the host device 100 and the portable storage device 200 share each other's random number$_S$, that is, random number$_H$ and random number$_S$.

As a result, the host device 100 and the portable storage device 200, sharing each other's random numbers, generate their session keys in operations S40 and S42. Here, in order for the host device 100 and the portable storage device 200 to generate their session keys, the same algorithm may be used. Therefore, the host device 100 and the portable storage device 200 share the same session key.

After authentication is completed, encryption and decryption of the data to be transmitted between the host device 100 and the portable storage device 200 using their session keys can further provide for increased security in data transmission. In several exemplary embodiments that are described below, unless otherwise noted, it is to be understood that the host device 100 and the portable storage device 200 encrypt and decrypt the data to be transmitted to each other using each session key generated by the authentication.

Figure 2:
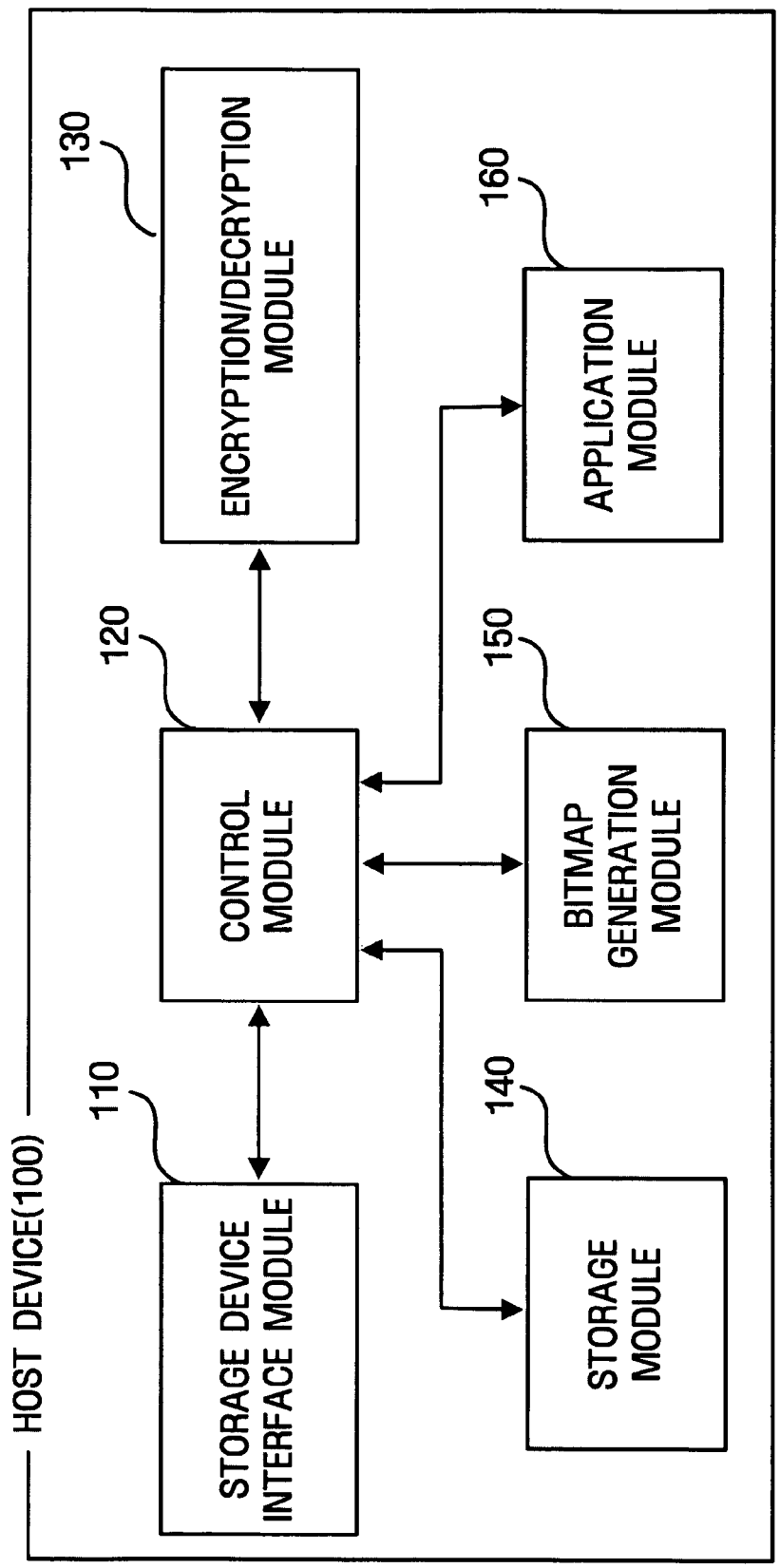
FIG. 2 is a block diagram of a host device according to an exemplary embodiment of the present invention.

FIG. 2 is a block diagram of a host device according to an exemplary embodiment of the present invention.

The host device 100 includes a storage device interface module 110, a control module 120, an encryption/decryption module 130, a storage module 140, a bitmap generation module 150, and an application module 160.

The storage device interface module 110 transmits/receives data to/from the portable storage device 200. To this end, the storage device interface module 110 allows the host device 100 to be connected with the portable storage device 200. When the host device 100 is connected with the portable storage device 200 in the present invention, the interface module 110 of the host device 100 is electrically connected with the interface module 210 of the portable storage device 200. However, this is just an example, and "being connected" simply implies in this exemplary embodiment that two devices can communicate with each other through a wireless medium in a non-contact state.

The control module 120 controls operations of various modules constituting the host device 100. In addition, when the host device 100 is connected with the portable storage device 200, the control module 120 can control the authentication that has been described with reference to FIG. 1.

The encryption/decryption module 130 performs encryption and decryption on predetermined data. That is, in request of the control module 120, the encryption/decryption module 130 encrypts the data to be transmitted to the portable storage device 200 or decrypts the encrypted data received from the portable storage device 200. The encryption/decryption module 130 may perform public key encryption or private key encryption. One or more encryption/decryption modules for performing both encryption types may exist.

Alternatively, the encryption/decryption module 130 may generate a predetermined random number required during authentication.

The storage module 140 stores an encrypted content, RO, CRL, and a certificate of the host device 100. In addition, the storage module 140 stores information regarding identifiers and locations of ROs stored in the portable storage device 200. The identifiers and locations of ROs are obtained from the portable storage device 200 through the storage device interface module 110.

Figure 3:
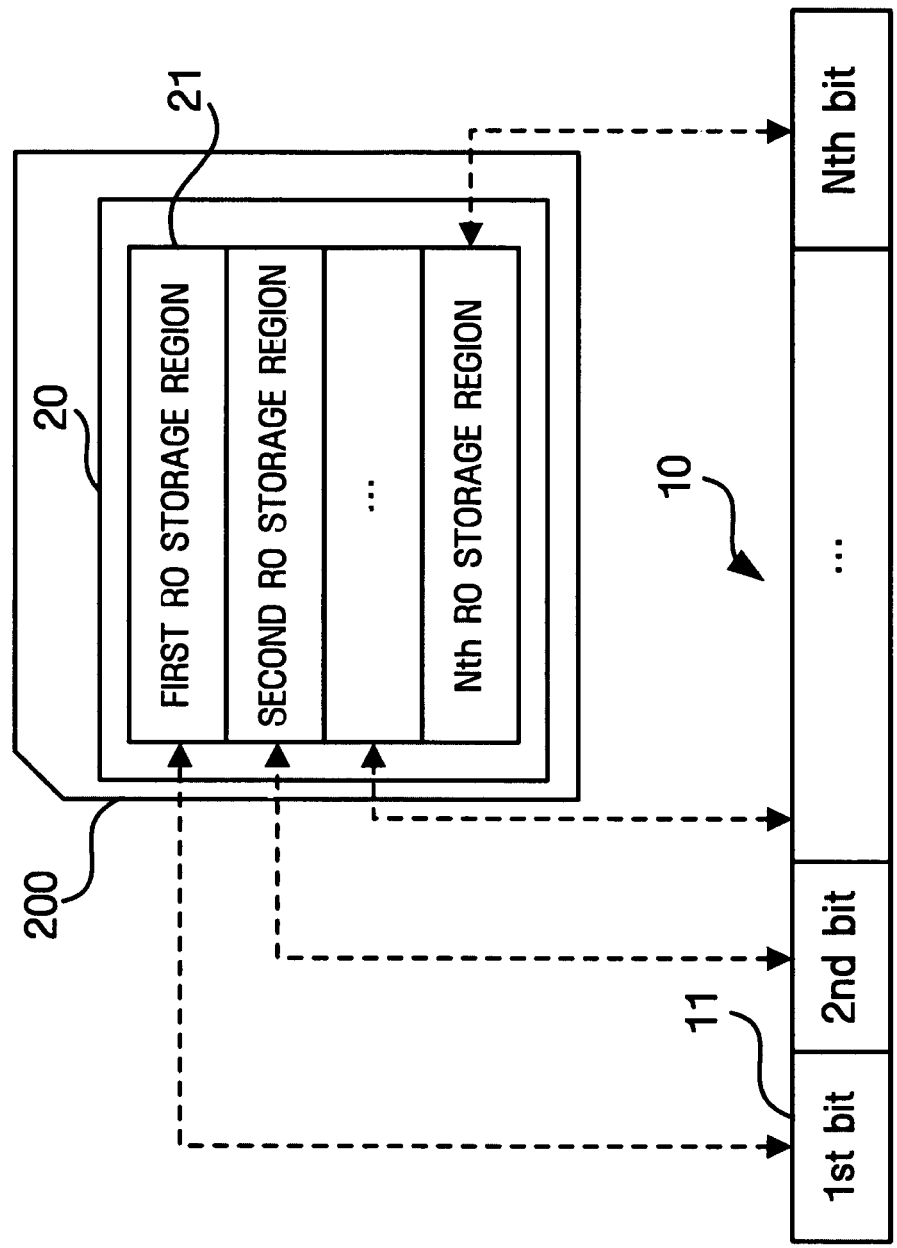
FIG. 3 illustrates a bitmap according to an exemplary embodiment of the present invention.

The bitmap generation module 150 generates a bitmap required for updating meta information of the ROs stored in the portable storage device 200. As shown in FIG. 3, the bitmap 10 may be a set of bit strings. Bits of the bitmap 10 correspond to RO storage regions 20 of the same size allocated for the respective ROs in the portable storage device 200.

The bitmap generation module 150 generates the bitmap 10 such that bits stored in the RO storage regions 20 having state-changed ROs have inverted values of the other bits. For example, referring to FIG. 3, to change state information of an RO stored in a first RO storage region 21, the bitmap generation module 150 sets the first bit 11 to 1 to represent state information of the RO stored in the first RO storage region 21 of the portable storage device 200 and sets the remaining bits, that is, the second through the Nth bits, to 0's, respectively. Since the information regarding the locations of the respective storage regions and the identifiers of the ROs stored therein are stored in the storage module 140, the bitmap generation module 150 obtains information regarding where ROs with state information changed are to be stored using the obtained location information.

The application module 160 implements the encrypted content using the ROs stored in the storage module 140 or the ROs stored in the portable storage device 200. For example, if the encrypted content is in a compressed MPEG (Moving Picture Experts Group) format, the application module 160 may be an MPEG decoding module that can reproduce a moving picture.

Figure 4:
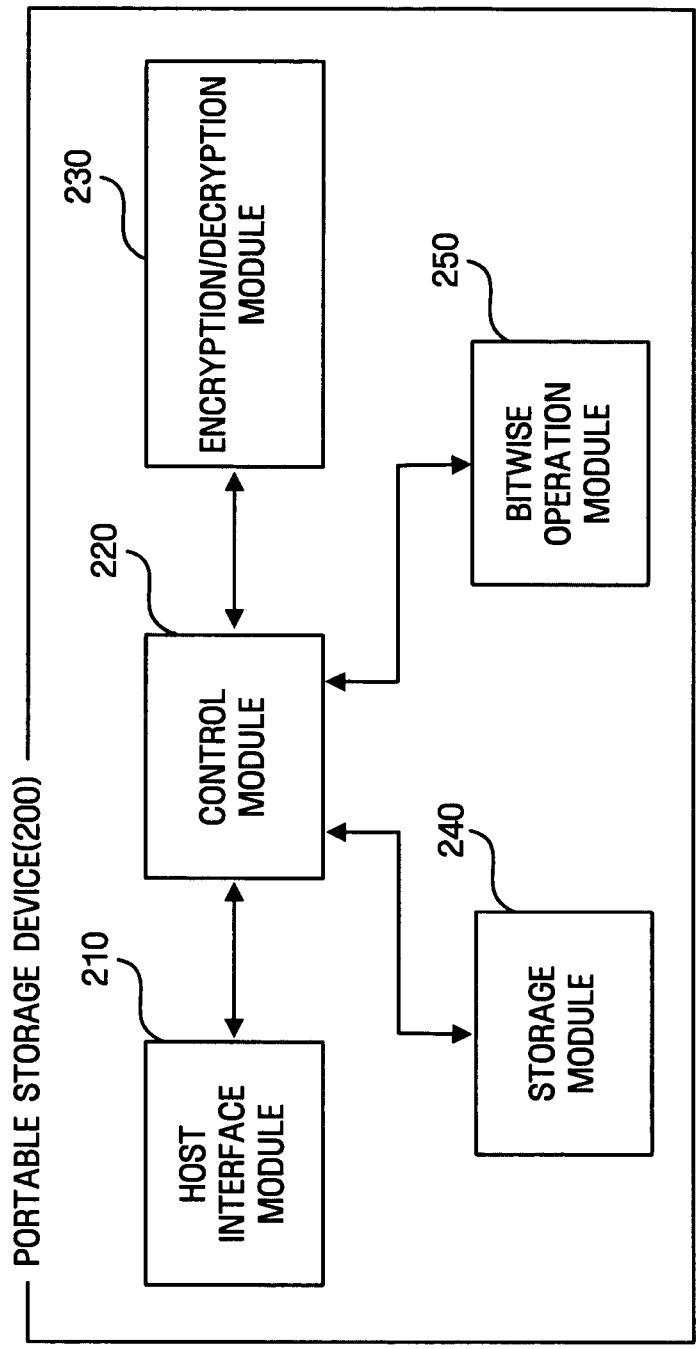
FIG. 4 is a block diagram of a portable storage device according to an exemplary embodiment of the present invention.

FIG. 4 is a block diagram of a portable storage device according to an exemplary embodiment of the present invention.

The portable storage device 200 includes a host interface module 210, a control module 220, an encryption/decryption module 230, a storage module 240, and a bitwise operation module 250.

The host interface module 210 transmits/receives data to/from the host device 100. To this end, the portable interface module 210 allows the portable storage device 200 to be connected with the host device 100. Here, when the host device 100 is connected with the portable storage device in the present invention, the interface module 110 of the host device 100 is electrically connected with the interface module 210 of the portable storage device 200. However, this is just an example, and "being connected" simply implies that two devices can communicate with each other through a wireless medium in a non-contact state.

The control module 220 controls operations of various modules constituting the portable storage device 200. In particular, the control module 220 can perform reading, writing, and erasure operations with respect to the storage module 240. Thus, the control module 220 can update meta data of the ROs stored in the storage module 240 using the operation result of the bitwise operation module 250. In addition, the control module 220 can control the authentication that has been described with reference to FIG. 1.

The encryption/decryption module 230 performs encryption and decryption on predetermined data. That is, in request of the control module 220, the encryption/decryption module 230 encrypts the data to be transmitted to the host device 100 or decrypts the encrypted data received from the portable storage device 200. The encryption/decryption module 130 may perform public key encryption or private key encryption. One or more encryption/decryption modules for performing both encryption types may exist.

In particular, ROs may be stored in the storage module 240 in encrypted states and the portable storage device 200 allows the encryption/decryption module 230 to encrypt the ROs using unique encryption keys that cannot be read by the host device 100.

Further, the encryption/decryption module 230 may generate a predetermined random number required during authentication.

The storage module 240 stores an encrypted content, RO, CRL, and a certificate of the host device 100. The storage module 240 may be, for example, a flash memory.

Figure 5:
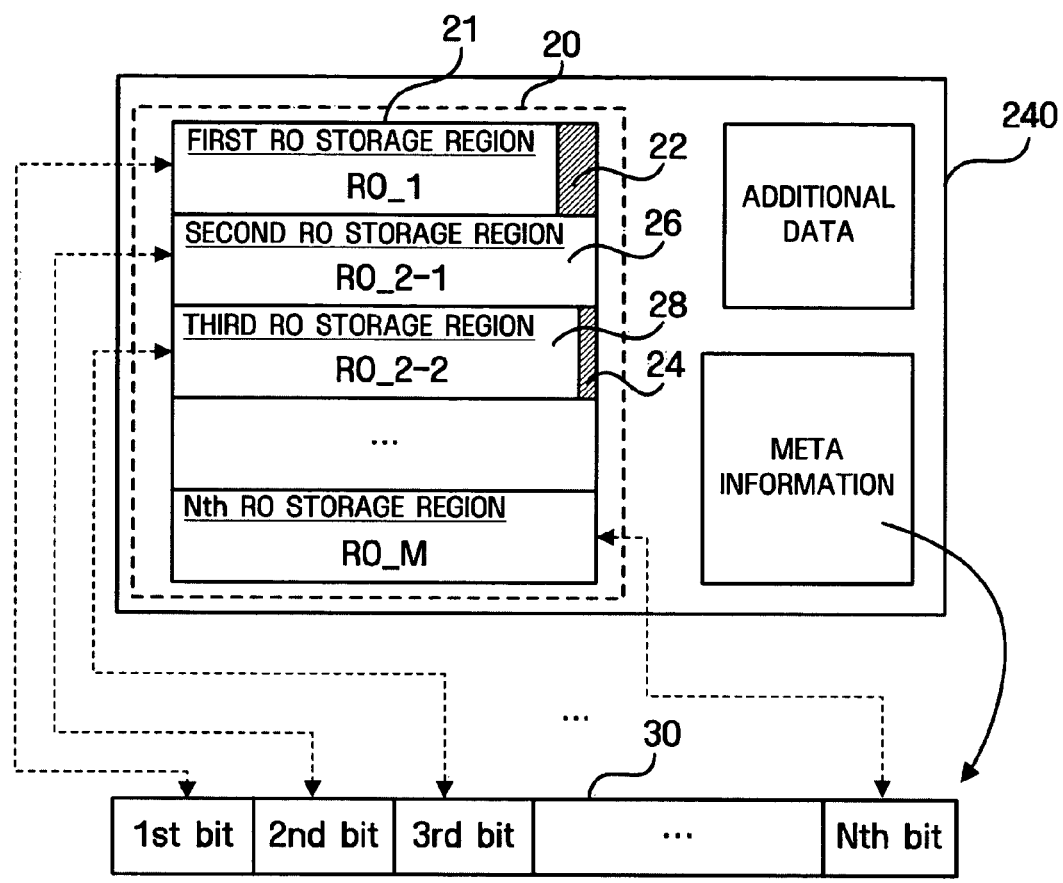
FIG. 5 is a diagram for illustrating RO storage regions and meta information.

The storage module 240 includes a plurality of RO storage regions 20 of the same size allocated for storage of the respective ROs, as shown in FIG. 5. Here, when the size of an RO is smaller than that of a storage region, e.g., redundant regions 22 and 24 may be filled with null values or predetermined hash values of the respective ROs. On the other hand, when the size of an RO is larger than that of a storage region, an RO may be fragmented into two or more parts. The fragmented parts are stored in separate storage regions. In the illustrative, exemplary embodiment, RO_2-1 and RO_2-2 are stored in the second and third RO storage regions 26 and 28, respectively.

Meanwhile, the storage module 240 stores meta information 30 of the ROs. Here, bits included in the meta information 30 correspond to the respective RO storage regions 20. For example, as illustrated in FIG. 5, the 1st bit included in the meta information 30 represents state information regarding the RO_1 stored in the first RO storage region 21 of the storage module 240. The 2nd bit included in the meta information 30 represents state information regarding the RO_2-1 stored in the second RO storage region 26 of the storage module 240.

When the storage module 240 is implemented by an NAND flash memory, all bits included in the first meta information are '1' in the initial state. Then, bits on which writing operations are performed are set to '0' and reset to '1' by performing erasure operations thereon.

In a flash memory, a writing operation is performed in a page basis while an erasure operation is performed in a block basis, which means that the erasure operation requires an operation quantity larger than the writing operation. Therefore, it is preferable that bit value corresponding to write operation of the flash memory (in an NAND flash memory, the bit value is '0') is allocated to a more frequently occurring state, and bit value corresponding to erasure operation of the flash memory (in an NAND flash memory, the bit value is '1') is allocated to the less frequently occurring state of the two states.

A usable state and an unusable state of an RO according to an exemplary embodiment will be described. Let K and L be a number of cases of being changed from a 'usable state' to a 'unusable state' when a new RO is stored in the storage module 240 and a number of cases of being changed from a 'usable state' to a 'unusable state' when a new RO is deleted from the storage module 240 or the RO is completely consumed, respectively. Then, the following relationship is satisfied: $K \geq L$. Therefore, a bit value corresponding to a write operation of the flash memory can be allocated to the 'usable state', which is the more frequently occurring state of the two states, while a bit value corresponding to an erasure operation of the flash memory can be allocated to the 'unusable state', which is the less frequently occurring state of the two states. In other words, when the storage module 240 is implemented by an NAND flash memory, the 'usable state' may be set to '0' and the 'unusable state' may be set to '1'.

Referring back to FIG. 4, the bitwise operation module 250 performs a bitwise operation on the bitmap received from the host device 100 and the meta information stored in the storage module 240. The bitwise operation is a logical operation for determining new logical values through a combination of logical values and logical variables. In the bitwise operation, various operators, including OR, AND, XOR (exclusive OR), NOR (not OR), NAND (not AND), and so on, are used.

In FIGS. 2 and 4, a module includes, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

A method of updating RO states by the host device 100 and the portable storage device 200 will now be described in more detail with reference to FIGS. 6 through 8. In various embodiments, an explanation will be given with regard to usability of an RO using meta information.

Figure 6:
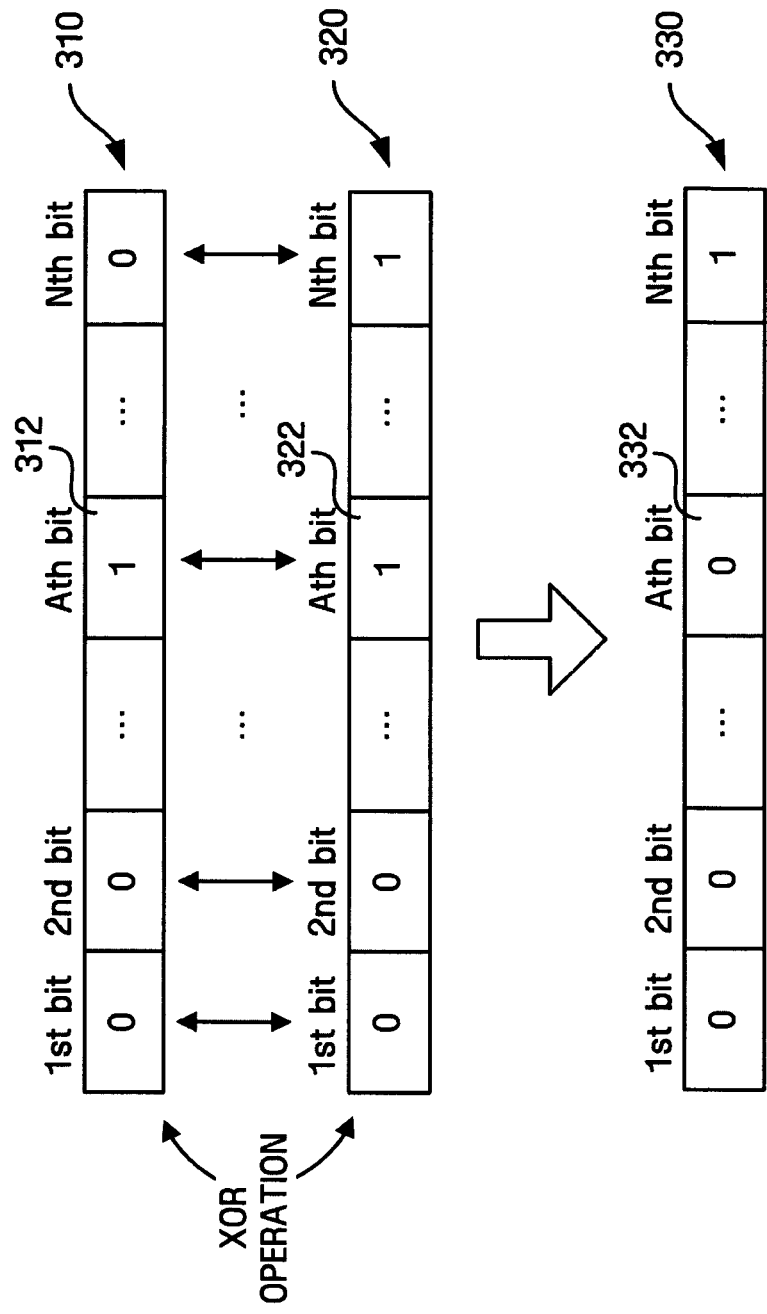
FIG. 6 illustrates a bitwise operation procedure according to an exemplary embodiment of the present invention.

FIG. 6 illustrates a bitwise operation procedure according to an exemplary embodiment of the present invention.

In the illustrative embodiment, state information of an RO is changed from a 'usable state' to a 'unusable state' by way of example. In addition, a bitwise operation module 250 of the portable storage device 200 performs an XOR operation and a storage module 240 is implemented by a NAND flash memory. Further, on the basis of an occurrence frequency of state information, a 'usable state' is set to '0' and an 'unusable state' is set to '1'.

In order for the host device 100 to change the state information of an RO stored in the portable storage device 200, the bitmap generation module 150 generates a bitmap 310. To change state information of an RO stored in the Ath RO storage region in the storage module 240 of the portable storage device 200, the bitmap generation module 150 sets the Ath bit 312 included in the bitmap 310 to '1' and the remaining bits are all set to '0'.

The bitmap 310 generated by the bitmap generation module 150 is transmitted to the portable storage device 200 via the storage device interface module 110.

If the host interface module 210 of the portable storage device 200 receives the bitmap 310 from the host device 100, the bitwise operation module 250 performs a bitwise operation, that is, an XOR operation, on the meta information 320 stored in the storage module 240 and the bitmap 310. As shown in FIG. 6, the Ath bit 312 included in the bitmap 310 is set to '1', suggesting that the RO stored in the Ath RO storage region in the storage module 240 is in a unusable state, or none may be stored in the Ath RO storage region in the storage module 240. Thus, when a usable RO is newly stored in the Ath RO storage region in the storage module 240, the value of the Ath bit 322 included in the meta information 320 should be changed from 1 to '0'.

As confirmed from FIG. 6, illustrating a bitwise operation result 330, the value of the Ath bit 322 is changed to '0'. A control module 220 of the portable storage device 200 can update the meta information 320 stored in the storage module 240 using the bitwise operation result 330.

For example, among bits included in the bitwise operation result 330, only the Ath bit 332 has a different value from the conventional meta information 320 and the remaining bits have the same value as the conventional meta information 320. Since the bitwise operation result 330 caused the Ath bit 322 to change its bit value from '1' to '0', the control module 220 performs a writing operation on a page including the Ath bit 322 of the meta information 320 stored in the storage module 240, thereby changing the bit value of the Ath bit 322.

Figure 7:
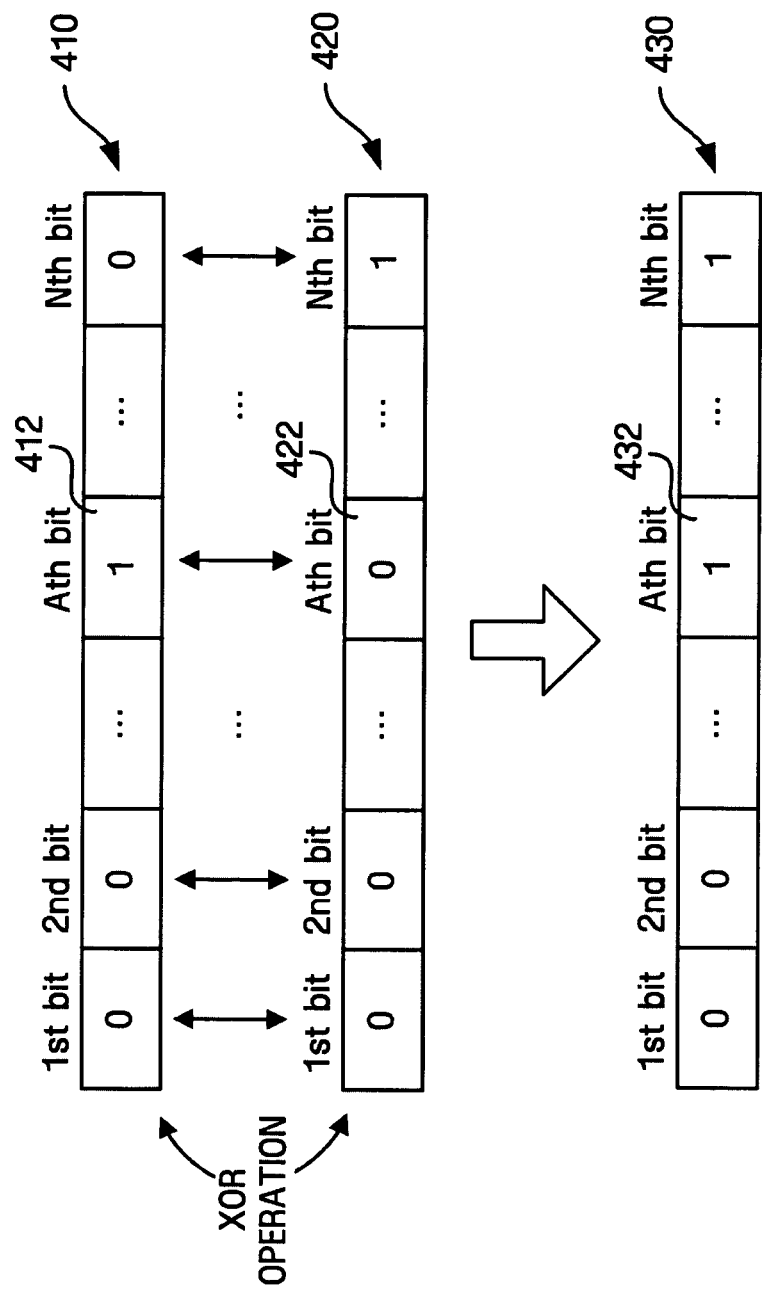
FIG. 7 illustrates a bitwise operation procedure according to another exemplary embodiment of the present invention.

FIG. 7 illustrates a bitwise operation procedure according to another exemplary embodiment of the present invention.

In the illustrative embodiment, state information of an RO is changed from a 'usable state' to a 'unusable state' by way of example. In addition, a bitwise operation module 250 of the portable storage device 200 performs an XOR operation and a storage module 240 is implemented by a NAND flash memory. Further, on the basis of an occurrence frequency of state information, a 'usable state' is set to '0' and an 'unusable state' is set to '1'.

In order for the host device 100 to change the state information of an RO stored in the portable storage device 200, the bitmap generation module 150 generates a bitmap 410. To change state information of an RO stored in the Ath RO storage region in the storage module 240 of the portable storage device 200, the bitmap generation module 150 sets the Ath bit 412 included in the bitmap 410 to '1' and the remaining bits are all set to '0'.

The bitmap 410 generated by the bitmap generation module 150 is transmitted to the portable storage device 200 via the storage device interface module 110.

If the host interface module 210 of the portable storage device 200 receives the bitmap 410 from the host device 100, the bitwise operation module 250 performs a bitwise operation, that is, an XOR operation, on the meta information 420 stored in the storage module 240 and the bitmap 410. As shown in FIG. 7, the Ath bit 422 of the meta information 420 is set to '0', suggesting that a usable RO is newly stored in the Ath RO storage region in the storage module 240. Thus, when an RO is deleted from the Ath bit 422 of the storage module 240 or no more ROs are available from the Ath RO storage region in the storage module 240, the value of the Ath bit 422 included in the meta information 420 should be changed to '1'.

As confirmed from FIG. 7, illustrating a bitwise operation result 430, the value of the Ath bit 422 is changed from '0' to '1'. The control module 220 of the portable storage device 200 can update the meta information 420 stored in the storage module 240 using the bitwise operation result 430.

For example, among bits included in the bitwise operation result 430, only the Ath bit 432 has a different value from the conventional meta information 420 and the remaining bits have the same value as the conventional meta information 420. Since the bitwise operation result 430 caused the Ath bit 422 to change its bit value from '0' to '1', the control module 220 performs an erasure operation on the entire block including the Ath bit 422 of the meta information 420 stored in the storage module 240 (that is, changes the state information from '0' to '1'), followed by performing a writing operation on the remaining bits, exclusive of the Ath bit 422, using the bitwise operation result 430 (that is, changes the state information from '1' to '0') to make the remaining bits return to the original states.

Figure 8:
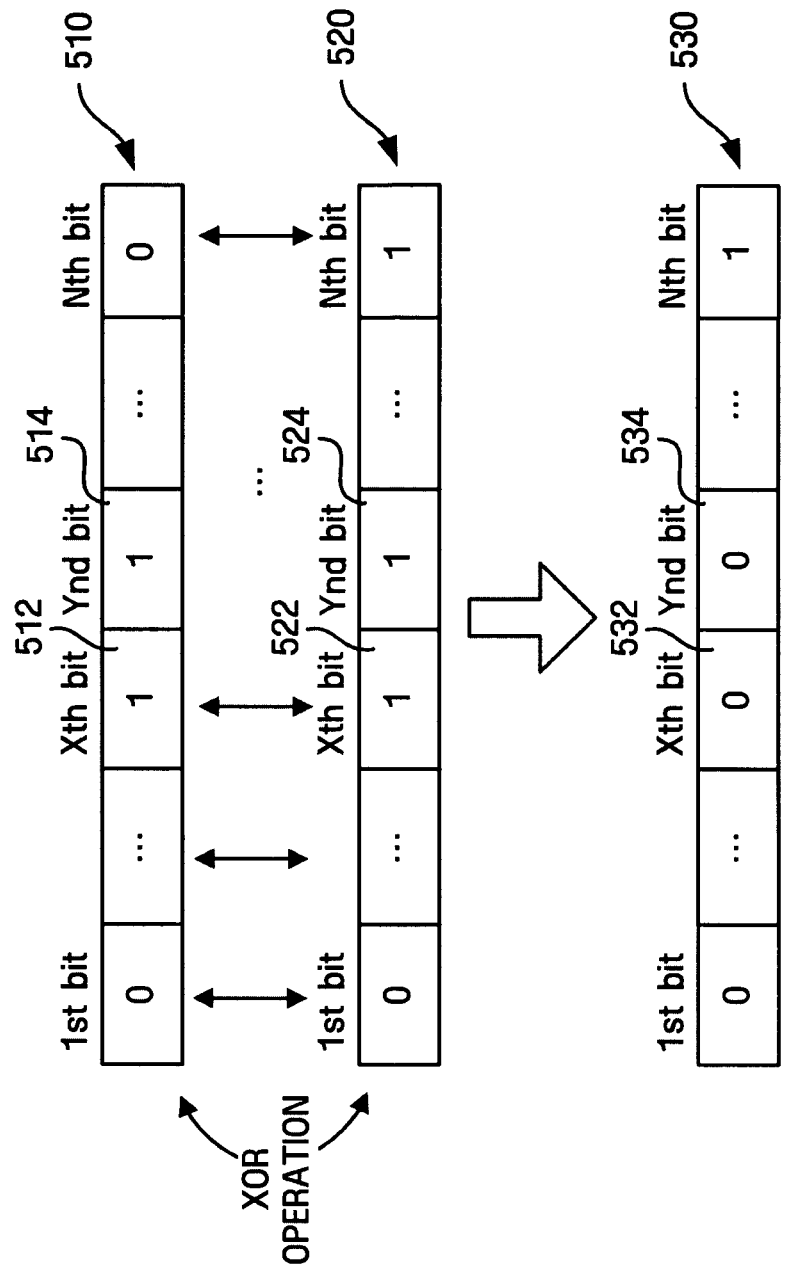
FIG. 8 illustrates a bitwise operation procedure according to still another exemplary embodiment of the present invention.

FIG. 8 illustrates a bitwise operation procedure according to still another exemplary embodiment of the present invention.

In the illustrative embodiment, a plurality of pieces of state information is changed from a 'usable state' to a 'unusable state' by way of example. As shown in FIG. 5, an RO may be fragmented into two or more parts and stored in the storage module 240 of the portable storage device 200. The fragmented RO parts are physically separated from one another but are logically one RO. Thus, it is desirable to simultaneously change the fragmented RO as a whole.

In an exemplary embodiment, a bitwise operation module 250 of the portable storage device 200 performs an XOR operation and a storage module 240 is implemented by a NAND flash memory. Further, on the basis of an occurrence frequency of state information, a 'usable state' is set to '0' and an 'unusable state' is set to '1'.

In order for the host device 100 to change state information of ROs stored in the portable storage device 200, the bitmap generation module 150 generates a bitmap 510. To change state information of ROs stored in the Xth RO and Yth RO storage regions of the storage module 240 of the portable storage device 200, the bitmap generation module 150 sets the Xth and Yth bits 512 and 514 included in the bitmap 510 to '1' and the remaining bits are all set to '0'.

The bitmap 510 generated by the bitmap generation module 150 is transmitted to the portable storage device 200 via the storage device interface module 110.

If the host interface module 210 of the portable storage device 200 receives the bitmap 510 from the host device 100, the bitwise operation module 250 performs a bitwise operation, that is, an XOR operation, on the meta information 520 stored in the storage module 240 and the bitmap 510. As shown in FIG. 8, the Xth and Yth bits 512 and 514 included in the bitmap 510 are set to '1', suggesting that the ROs stored in the Xth RO and Yth RO storage regions in the storage module 240 are in unusable states. It may means that no ROs are stored in the Xth RO and Yth RO storage regions. Thus, when any usable RO part is newly stored in the Xth RO and Yth RO storage regions in the storage module 240, the values of the Xth and Yth bits 522 and 524 included in the bitmap 520 should be changed to '0'.

As shown in FIG. 8, illustrating a bitwise operation result 530, the values of the Xth and Yth bits 522 and 524 included in the bitmap 520 have been changed to '0'. The control module 220 of the portable storage device 200 can update the meta information 520 stored in the storage module 240 using the bitwise operation result 530.

For example, among bits included in the bitwise operation result 530, only the Xth and Yth bits 532 and 534 have different values from the conventional meta information 520 and the remaining bits have the same value as the conventional meta information 520. Since the bitwise operation result 530 cause the Xth and Yth bits 522 and 524 to change their bit values from '0' to '1', the control module 220 performs a writing operation on a page including the Xth and Yth bits 522 and 524 of the meta information 520 stored in the storage module 240 (that is, changes the state information from '0' to '1').

While a description of a case of changing a plurality of pieces of status information of meta information from a 'usable state' to an 'unusable state' will not be given, it is to be readily understood from describing with reference to FIGS. 7 and 8.

In addition, while the invention has been described that the bitwise operation module 250 of the portable storage device 200 performs an XOR operation with reference to FIGS. 6 through 8, the bitwise operation module 250 may perform other types of operations. In such cases, the bitmap generation module 150 of the host device 100 may changes bits associated with RO storage regions having ROs and bit values to be set the bits. Here, the ROs have state information changed in the bitmap according to the operation type to be performed by the bitwise operation module 250.

Operating procedures between the host device 100 and the portable storage device 200 according to an embodiment of the present invention will now be described.

Figure 9:
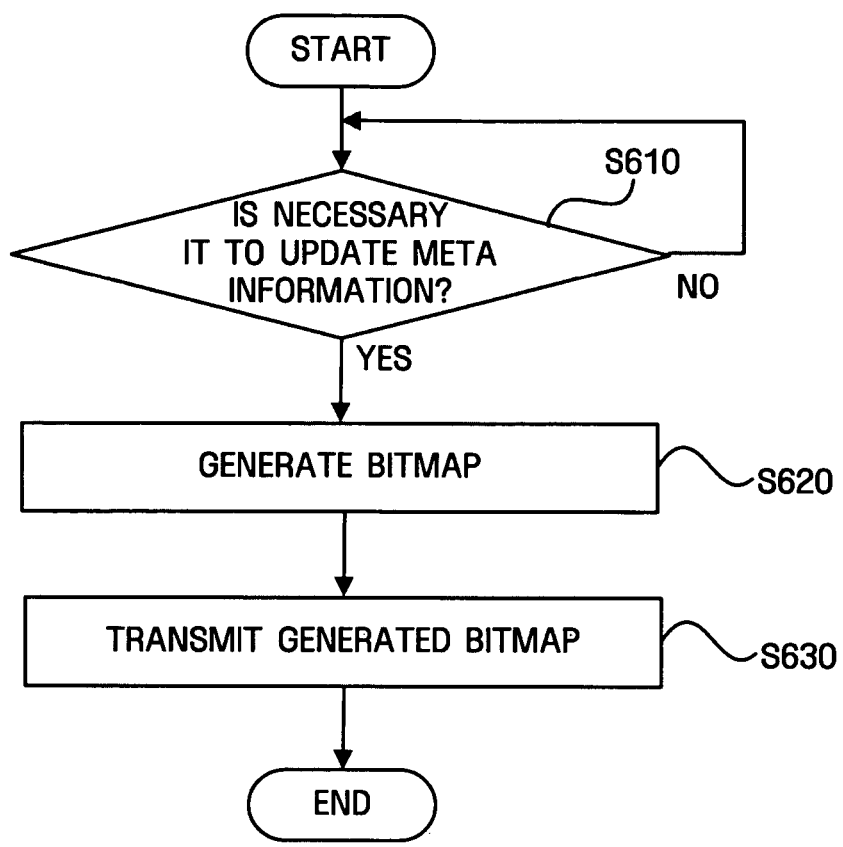
FIG. 9 is a flowchart illustrating an updating procedure in which a host device updates meta information of an RO according to an exemplary embodiment of the present invention.

FIG. 9 is a flowchart illustrating an updating procedure in which a host device updates meta information of an RO according to an embodiment of the present invention.

In operation 610, the control module 120 determines whether the meta information of ROs stored in the portable storage device 200 is to be updated. When a change occurs to an RO stored in the storage module 240 of the portable storage device 200, the meta information should be updated. For example, as to the meta information indicating usability of the RO stored in the storage module 240 of the portable storage device 200, when the host device 100 copies or moves the RO to the portable storage device 200, the portable storage device 200 stores the RO in a usable state and the host device 100 executes a content using the usable RO until the RO is used up. Consequently, since the RO is deleted from the portable storage device 200, the meta information should be updated.

If it is determined that the meta information of ROs stored in the portable storage device 200 is to be updated, the bitmap generation module 150 generates a bitmap for updating the meta information in operation S620. Bits constituting the bitmap generated by the bitmap generation module 150 correspond to RO storage regions allocated for the respective ROs in the portable storage device 200, respectively. A description of the bitmap is the same as above. The bits are associated with the RO storage regions having ROs are obtained from the information regarding identifiers and locations of the ROs. State information of the ROs should be changed. The identifiers and locations of ROs are obtained by the request of the control module 120 from the portable storage device 200 through the storage device interface module 110. Even though there is no request by the control module 120, a new RO is stored in the storage module 240 of the portable storage device 200 or a pre-stored RO is deleted from the storage module 240 of the portable storage device 200, the control module 220 of the portable storage device 200 may transmit the information regarding identifiers and locations of ROs to the host device 100 through the host interface module 210.

If the bitmap generation module 150 generates a bitmap, the storage device interface module 110 transmits the generated bitmap to the portable storage device 200 in operation S630.

Figure 10:
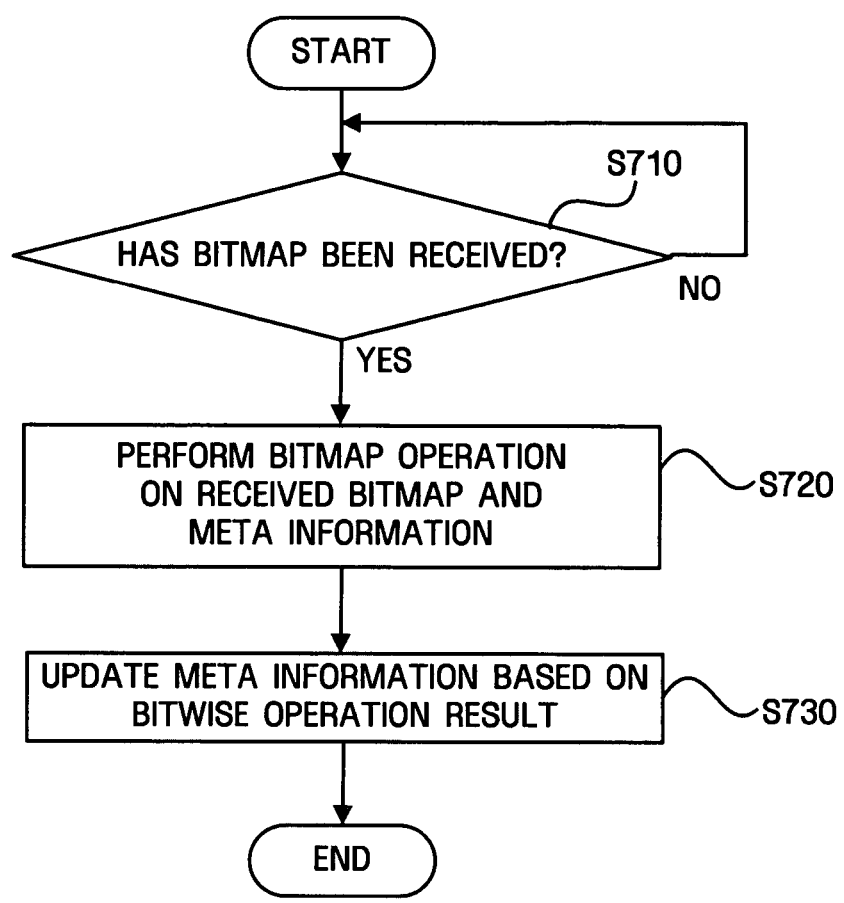
FIG. 10 is a flowchart illustrating an updating procedure in which a portable storage device updates meta information of an RO according to an exemplary embodiment of the present invention.

FIG. 10 is a flowchart illustrating an updating procedure in which a portable storage device updates meta information of an RO according to an embodiment of the present invention.

If the host interface module 210 receives the bitmap from the host device 100 in operation S710, the bitwise operation module 250 performs a bitwise operation on the received bitmap and the meta information stored in the storage module 240 in operation S720. Here, the bitwise operation is performed on corresponding bits among the bits constituting the bitmap and the bits included in the meta information. The corresponding bits are bits associated with the same RO storage regions.

In operation S730, the control module 220 updates the meta information stored in the storage module 240 using the bitwise operation result. The updating of the meta information is the same as above with reference to FIGS. 6 through 8.

The host device, the portable storage device, and the method of updating the meta information of ROs stored in the portable storage device according to the present invention provide at least the following advantages.

First, since the portable storage device updates meta information of an RO with a relatively small computation quantity, overhead of the portable storage device can be reduced.

Second, a computation quantity of the portable storage device can be reduced by allocating a writing operation to the less frequently occurring state.

Third, meta information for a plurality of fragmented RO parts in a portable storage device can be simultaneously changed with a reduced computation quantity.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described embodiments have been provided only in a descriptive sense and will not be construed as placing any limitation on the scope of the invention.

What is claimed is:

1. A method of updating meta information of rights objects (ROs) stored in a portable storage device, the method comprising:

generating, by the host device, a bitmap comprising bits whose values indicate whether a state of the ROs has changed;

transmitting, by the host device, the generated bitmap to the portable storage device;

performing, by the portable storage device, a bitwise operation on the generated bitmap together with meta information indicating a state of the ROs stored in the portable storage device; and updating, by the portable storage device, the meta information using a result of the bitwise operation.

2. The method of claim 1, wherein the generating comprises generating, by the host device, a bitmap comprising bits associated with RO storage regions of the portable storage device that store the ROs.

3. The method of claim 1, wherein the generating comprises generating, by the host device, a bitmap comprising bits associated with RO storage regions of the portable storage device storing ROs whose states have changed, that have inverted values of remaining bits included in the bitmap.

4. The method of claim 3, wherein bit values of the respective bits included in the meta information indicate either one of two states, and wherein the updating comprises updating the meta information such that bit values corresponding to a write operation of a flash memory used by the portable device are allocated to a more frequently occurring state, and bit values corresponding to an erasure operation of the flash memory are allocated to a less frequently occurring state of the two states.

5. A method of updating meta information of rights objects (ROs) stored in a portable storage device, the method comprising:

receiving, by the portable storage device, a predetermined bitmap comprising bits whose values indicate whether a state of the ROs has changed;

performing, by the portable storage device, a bitwise operation on the received bitmap and meta information indicating states of the ROs; and updating, by the portable storage device, the meta information using a result of the bitwise operation.

6. The method of claim 5, wherein the receiving comprises receiving, by the portable storage, a predetermined bitmap comprising bits that correspond to RO storage areas of the portable storage device allocated for storing ROs; and wherein the performing comprises performing, by the portable storage device, a bitwise operation on corresponding bits among the bits constituting the bitmap and bits included in the meta information that correspond to the RO storage areas of the portable storage device allocated for storing ROs.

7. The method of claim 6, wherein the updating comprises updating, by the portable storage device, the meta information to indicate usability of the ROs stored in the RO storage regions.

8. The method of claim 5, wherein the performing comprises performing, by the portable storage device, a bitwise operation on meta information indicating states of the ROs and the received bitmap, which comprises bits associated with RO storage regions of the portable storage device storing ROs whose states have changed, that have inverted values of remaining bits included in the bitmap.

9. The method of claim 5, wherein the updating comprises storing the meta information in a flash memory.

10. The method of claim 9, wherein bit values of the respective bits included in the meta information indicate either one of two states, and wherein the updating comprises updating the meta information such that bit values corresponding to a write operation of the flash memory are allocated to a more frequently occurring state, and bit values corresponding to erasure operation of the flash memory are allocated to a less frequently occurring state of the two states.

11. A host device comprising:

a processor; and a computer readable medium having stored thereon executable instructions that when executed by the processor cause the processor to perform a method comprising:

generating a bitmap which is subjected to a bitwise operation together with meta information indicating a state of rights objects (ROs) stored in a portable storage device and which comprises bits whose values indicate whether a state of the ROs has changed; and transmitting the generated bitmap to the portable storage device wherein said portable storage device performs a bitwise operation on the generated bitmap together with meta information indicating a state of the RO stored in a portable storage device, and updates the meta information using a result of the bitwise operation.

12. The host device of claim 11, wherein the generating comprises generating, by the host device, a bitmap comprising bits associated with RO storage regions of the portable storage device that store the ROs.

13. The host device of claim 11, wherein the generating comprises generating, by the host device, a bitmap comprising bits associated with RO storage regions of the portable storage device storing ROs whose states have changed, that have inverted values of remaining bits included in the bitmap.

14. The host device of claim 13, wherein bit values of the respective bits included in the meta information indicate either one of two states, and wherein the updating comprises updating the meta information such that bit values corresponding to a write operation of a flash memory used by the device are allocated to a more frequently occurring state, and bit values corresponding to a write operation of the flash memory are allocated to the less frequently occurring state of the two states.

15. A portable storage device comprising:

a processor, and a computer readable medium having stored thereon executable instructions that when executed by the processor cause the processor to perform a method comprising:

storing rights objects (ROs) and meta information indicating states of the ROs;

receiving a predetermined bitmap comprising bits whose values indicate whether a state of the ROs has changed;

performing a bitwise operation on the received bitmap and the meta information; and updating the meta information using a result of the bitwise operation.

16. The portable storage device of claim 15, wherein the receiving comprises receiving a predetermined bitmap comprising bits that correspond to RO storage areas of the portable storage device allocated for storing ROs; and wherein the performing comprises performing a bitwise operation on corresponding bits among the bits constituting the bitmap and bits included in the meta information that correspond to the RO storage areas of the portable storage device allocated for storing ROs.

17. The portable storage device of claim 16, wherein the updating comprises updating the meta information to indicate usability of the ROs stored in the RO storage regions.

18. The portable storage device of claim 15, wherein the performing comprises performing a bitwise operation on meta information indicating states of the ROs and the received bitmap, which comprises bits associated with RO storage regions of the portable storage device storing ROs whose states have changed, that have inverted values of remaining bits included in the bitmap.

19. The portable storage device of claim 15, wherein the storing comprises storing the meta information in a flash memory.

20. The portable storage device of claim 19, wherein bit values of the respective bits included in the meta information indicate either one of two states, and wherein the updating comprises updating the meta information such that a bit value corresponding to a write operation of the flash memory is allocated to a more frequently occurring state, and a bit value corresponding to an erasure operation of the flash memory is allocated to the less frequently occurring state of the two states.

* * * * *